United States Patent Office 3,406,233

Patented Oct. 15, 1968

3,406,233

METHOD OF KILLING PESTS WITH S-(2,5-DI-CHLORO-3-THIENYL-THIOMETHYL) O,O-DI-ETHYLPHOSPHORODITHIOATE

Peter F. Epstein, El Cerrito, Calif., assignor to Stauffer Chemical Company, New York, N.Y., a corporation of Delaware

No Drawing. Original application July 15, 1964, Ser. No. 382,952, now Patent No. 3,341,553, dated Sept. 12, 1967. Divided and this application May 22, 1967, Ser. No. 654,289

1 Claim. (Cl. 424—202)

This a division of application Ser. No. 382,952, filed July 15, 1964, now U.S. Patent 3,341,553, issued Sept. 12, 1967.

This invention relates to a certain new and novel class of phosphorous containing organic compounds and to the utility of the same as insecticides and acaricides. The compounds are particularly valuable for their insecticidal and miticidal properties. More specifically this invention relates to thiophene phosphates of the general formula:

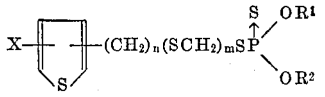

wherein X is selected from the group consisting of hydrogen, chlorine and bromine and combinations thereof, $R^1$ and $R^2$ are alkyl groups, *m* is an integer from 0 to 1 and *n* is an integer from 0 to 4, inclusive. The present invention includes a method of preparation, utility and application of said compounds to eliminate and control various insect pests as will be shown hereinafter.

Within the embodiment of the present invention, the thiophene phosphates of the above-mentioned formula, wherein *n* is greater than 1, are easily prepared by means of Example 2 of the following examples using the correspondingly suitable 2-(ω-chloroalkyl)-thiophene. Examples of such compounds that can be prepared are S-[γ-(2-thienyl) - propyl - thiomethyl]-O,O-diethyl-phosphorodithioate and S-[ω(2-thienyl)-butylthiomethyl]-O,O-diethyl-phosphorodithioate.

The compounds of the present invention can be prepared in accordance with the following illustrative examples.

Example 1

S - (2,5 - dichloro - 3-thienyl-thiomethyl)-O,O-diethyl-phosphorodithioate.—To a mixture of 2,5-dichlorothiophene-3-thiol (9.3 parts), potassium hydroxide (2.8 parts), ethanol (150 parts) and water (50 parts) was added S - chloromethyl - O,O - diethylphosphorodithioate (12.7 parts). After stirring under reflux for 2 hours the solvent was removed. The product obtained after drying was a yellow oil, 72.3% of theory, $n_D^{30}=1.5720$.

*Analysis.*—Calculated for $C_9H_{13}Cl_2O_2PS_4$: C, 28.20; H, 3.42; Cl, 18.50; P, 8.08; S, 33.46. Found: C, 28.76; H, 3.29; Cl, 18.81; P, 8.25; S, 33.22.

Example 2

S - (5 - chloro - 2 - thenyl) - O,O - diethylphosphorodithioate.—To a solution of potassium O,O-diethyl-phosphorodithioate (22.4 parts) in methyl ethyl ketone (200 parts) was added 2-chloromethyl-5-chlorothiophene (8.4 parts). After stirring and refluxing for 1 hour the precipitate of potassium chloride was removed and the product isolated from the filtrate. There was obtained a yellow oil in a yield 96% of theory, $n_D^{30}=1.5602$.

*Analysis.*—Calculated for $C_9H_{14}ClOPS_3$: C, 34.12; H, 4.45; Cl, 11.19; P, 9.78; S, 30.36. Found: C, 34.35; H, 4.77; Cl, 10.99; P, 9.62; S, 30.45.

The following is a table of the compounds prepared according to one of the above described procedures designated by the example number. Compound numbers have been assigned to each compound and are used throughout the balance of the application.

TABLE I

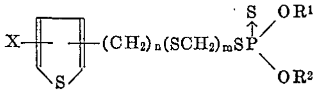

| Cpd. No. | Method of preparation | X | Position of thiophene substitution | *n* | *m* | $R^1$ and $R^2$ | $n_D^{30}$ |
|---|---|---|---|---|---|---|---|
| 1* | 1 | 5-Cl, H, 2-Cl | 3 | 0 | 1 | $C_2H_5$ | 1.5720 |
| 2 | 1 | H, H, H | 2 | 1 | 1 | $C_2H_5$ | 1.5735 |
| 3 | 1 | H, H, H | 3 | 0 | 0 | $C_2H_5$ | 1.5828 |
| 4* | 2 | 5-Cl, H, H | 2 | 1 | 0 | $C_2H_5$ | 1.5602 |
| 5 | 1 | 5-Cl, H, H | 2 | 1 | 1 | $C_2H_5$ | 1.5705 |
| 6 | 2 | 5-Br, H, H | 2 | 1 | 0 | $C_2H_5$ | 1.5670 |
| 7 | 2 | 5-Br, H, 2-Br | 3 | 1 | 0 | $C_2H_5$ | 1.5930 |
| 8 | 2 | 5-Br, H, H | 2 | 1 | 0 | $C_2H_5$ | 1.5781 |
| 9 | 2 | 5-Cl, H, 2-Cl | 3 | 1 | 0 | $C_2H_5$ | 1.5682 |
| 10 | 1 | 5-Cl, H, 2-Cl | 3 | 1 | 1 | $C_2H_5$ | 1.5763 |
| 11 | 2 | H, H, H | 3 | 1 | 0 | CH | 1.5262 |

*No. 1 prepared in Example 1. No. 4 prepared in Example 4.

As previously mentioned, the herein described new compositions produced in the above-described manner are biologically active compounds which are useful and valuable in controlling various pest organisms. The compounds of this invention were evaluated in the following tests.

*Insecticidal evaluation test.*—The housefly insect species—*Musca domestica* (Linn.)—was subjected to evaluation tests for insecticides incorporating the compounds of the present invention.

The procedure for the present test consisted of caging the test insects in cardboard mailing tubes 3⅛" in diameter and 2⅝" tall. The mailing tubes were supplied with cellophane bottoms and coarse mesh nylon tops. Each cage was provided with food and water. The toxicant was dissolved in a volatile solvent, preferably acetone, the active compound was pipetted into a petri dish bottom, allowed to air dry and placed in the cardboard mailing tube. Twenty-five female flies, three to five days old, were caged in the tube. The flies were continuously exposed to the known residue of the active compound in the cage. After twenty-four and forty-eight hours counts were made to determine living and dead insects. The LD–50 values were calculated using well-known procedures. The results reported in Table II under the designation "HF" were obtained.

*Acaricide evaluation test.*—The two-spotted mite, *Tetranychus telarius* (Linn.), was employed in tests for miticidal activity. Young pinto bean plants in the primary leaf stage were used as the host plants. The young pinto bean plants were infested with several hundred mites. Dispersions of candidate materials were prepared by dissolving 0.1 gram in 10 ml. of a suitable solvent, usually acetone. Aliquots of the toxicant solutions were suspended in water containing 0.0175% v./v. Sponto 221®, an emulsifying agent; the amount of water being sufficient to give concentrations of active ingredient ranging from 0.25% to 0.003%. The test suspensions were then sprayed on the infested pinto bean plants. After seven days, mortalities of adult, nymphal and ovicidal forms were determined. The percentage kill was determined by comparison with control plants which had not been sprayed with the candidates. The LD–50 value was calculated using well known procedures. The LD–50 values for two-spotted mite are reported under the columns post-embryonic (PE), nymph (NYM), and eggs (E) in the following table.

TABLE II

| Compound number | Insect activity (HF) | Acaricide activity | | |
|---|---|---|---|---|
| | | PE | NYM | E |
| 1 | 50 μg | 0.03 | 0.03 | 0.1 |
| 2 | 30 μg | 0.03 | 0.03 | 0.1 |
| 3 | 30 μg | 0.005 | 0.005 | 0.005 |
| 4 | 100 μg | 0.03 | ---------- | 0.1 |
| 5 | 30 μg | 0.005 | 0.005 | 0.005 |
| 6 | 75 μg | 0.03 | ---------- | ---------- |
| 7 | 0.1 percent | 0.08 | ---------- | ---------- |
| 8 | 0.1 percent | 0.05 | ---------- | ---------- |
| 9 | 0.1 percent | 0.1 | ---------- | ---------- |
| 10 | 30 μg | 0.008 | ---------- | 0.03 |
| 11 | 0.1 percent | 0.03 | ---------- | 0.05 |

Several of the compounds of the present invention exhibited systemic miticidal properties. Particularly compounds number 1 and 3 were active as systemic acaricides. The compounds were subjected to a test to evaluate the root absorption and upward translocation of the candidate. Again the two-spotted mite was employed in the test for systemic activity. Young pinto bean plants in the primary leaf stage were used as the host plants. The plants were placed in bottles containing 200 ml. of the test solution and held in place with cotton plugs. Only the roots were immersed. The solutions were prepared by dissolving the compounds to be tested in a suitable solvent, usually acetone, and then diluting with distilled water. The final acetone concentration never exceeded 1%. The toxicants were initially tested at a concentration of 10 parts per million (p.p.m.). Immediately after the plants were placed in the test solutions they were infested with mites. Mortalities were determined after seven days. The percentage of kill was determined by comparison with control plants which had been placed in distilled water only. The LD–50 value in p.p.m. was calculated and reported: Compound number 1, 10 p.p.m. and number 3, 3 p.p.m.

From these data included above, it can be seen that these new compounds are valuable insecticides and acaricides. They may also be used in the form of emulsions, non-aqueous solutions, wettable powders, vapors, and dusts and the like, as may be best fitted to the particular utility. The application to an insect pest habitat of the compounds of the present invention is well known to those skilled in the art.

Various changes and modifications may be made without departing from the spirit and scope of the invention described herein as will be apparent to those skilled in the art to which it pertains. It is accordingly intended that the present invention shall only be limited by the scope of the appended claim.

We claim:

1. The method of killing pests selected from the group consisting of insects and acarids comprising applying to a pest habitat an effective amount of S-(2,5-dichloro-3-thienylthiomethyl)-O,O-diethylphosphorodithioate.

References Cited

UNITED STATES PATENTS 2,923,730 2/1960 Schrader ---------- 260—461
3,004,980 10/1961 Schrader ---------- 260—306
3,205,238 9/1965 Godfrey ---------- 260—332.5

ALBERT T. MEYERS, *Primary Examiner.*

S. J. FRIEDMAN, *Assistant Examiner.*